Patented Jan. 6, 1953

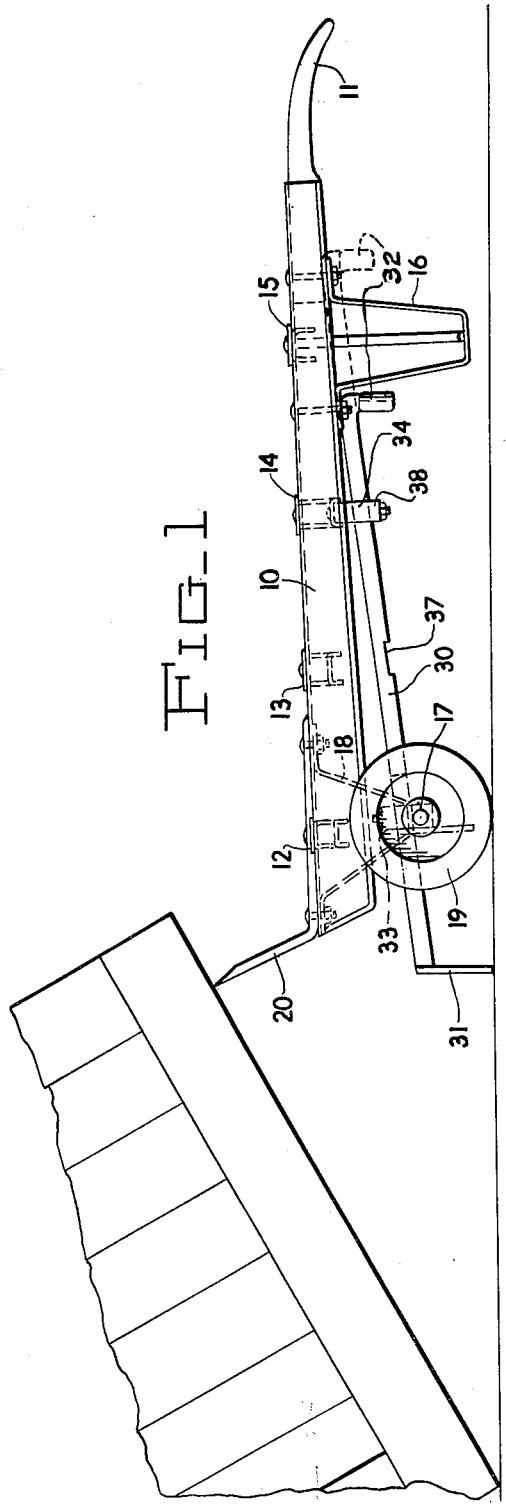
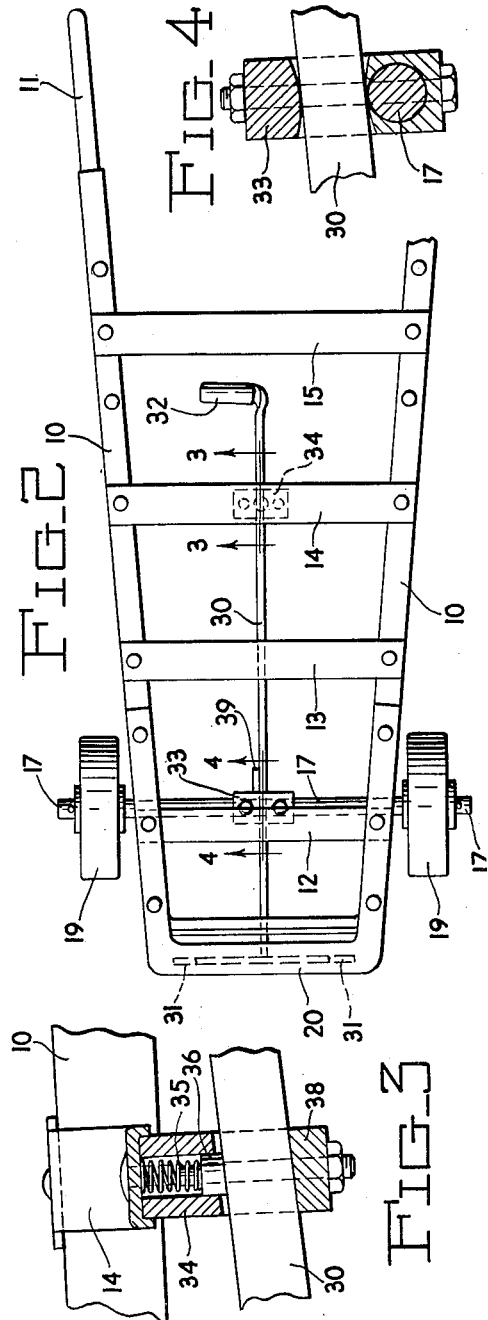
INVENTORS
ALBERT I. CODY
WILLIAM E. BRANDLEY
ATTORNEY

2,624,472

UNITED STATES PATENT OFFICE 2,624,472

HAND TRUCK

Albert I. Cody, Philadelphia, Pa., and William E. Brandley, Laurel Springs, N. J.

Application May 18, 1950, Serial No. 162,702

3 Claims. (Cl. 214—1)

This invention relates to hand trucks, and it relates more particularly to hand trucks having means whereby the truck may have greater usefulness in the handling of heavy packages, such as bales, boxes, crates, and the like.

The principal object of the present invention is to provide a hand truck of the conventional type with means whereby the same may be utilized to raise a portion of a package, which may thereafter be maintained in such position to permit the user to insert blocking, pallets, dollies, or similar devices, under the package, without requiring the intervention of another person to place such appliances under the package being handled.

A further object of the invention is to provide a hand truck with a device of the character aforesaid, which will be simple and efficient in its action but relatively inexpensive in construction.

The nature and characteristic features of the present invention will be more readily understood from the following description, taken in connection with the accompanying drawing forming part hereof, in which:

Figure 1 is a side elevation of a hand truck of a conventional type, provided with a device embodying the main features of the present invention, the same being shown in operative position, with the nose of the hand truck holding one end of a packing box in an elevated position thereby to permit the placing thereunder of blocking, pallets, dollies or other devices as may be required for the further handling of the package;

Fig. 2 is a top or plan view of the hand truck and its associated parts as shown in Fig. 1 of the drawing;

Fig. 3 is a detail view, partly in section taken approximately on the line 3—3 of Fig. 2; and Fig. 4 is a similar view taken approximately on the line 4—4 of Fig. 2.

It should, of course, be understood that the description and drawing herein are illustrative merely, and that various modifications and changes may be made in the structure disclosed without departing from the spirit of the invention.

Referring to the drawing, in the particular embodiment therein shown, the hand truck proper is of conventional form and comprises side members 10 preferably made of pressed steel, and provided with handles 11 of the usual kind and shape, at the rear end.

The side members 10 are connected by transversely extending cross pieces 12, 13, 14 and 15 also preferably made and formed from sheet steel.

Near the rear ends of the side members 10, leg members 16 are provided projecting downwardly from the side members 10, and near the other end of the truck a transverse shaft 17 is mounted by means of brackets 18. On each end of said shaft 17, beyond the side members 10, wheels 19 are mounted.

The front ends of the side members 10 are connected to each other by means of a nose member 20, which extends angularly upward and forward from the side members 10.

A longitudinally extending bar 30 is mounted on the under portion of the truck below the transverse cross members and the front end of said bar or rod 30 is provided with downwardly extending legs 31, whereas, the rear end of said bar or rod 30 is provided with a handle 32, which is adapted to be grasped by the operator to manipulate the bar or rod 30 in a manner and for a purpose to be presently explained.

The transverse wheel shaft 17 is provided intermediate its ends with a bracket member 33 through which the rod or bar 30 slidably extends.

The cross member 14 is provided with a bracket member 34 through which the rod or bar 30 also extends. The bracket member 34 is provided with an internally disposed coil spring 35, one end of which bears against a plug member 36 which is pressed against the upper edge of the rod or bar 30, the arrangement being such that when the said rod or bar is in the retracted position the notch 37 provided in the under edge of the rod or bar 30 will engage the lower portion 38 of the bracket member 34 and thereby hold the rod or bar 30 in such position.

When the rod or bar 30 is retracted the legs 31, carried at the front end of the rod or bar, will be located in a position adjacent the transverse shaft 17, and when in such position, will be out of engagement with the floor on which the wheels rest, by reason of the legs 17 being of such lengths that they will not reach the floor when in that position as shown by the dotted lines in Fig. 1 of the drawing.

The rod or bar 30 carries a lug member 39 which serves to limit the forward movement of the rod or bar 30.

However, when the rod or bar 30 is in its forward or operative position, by reason of the inclination of the rod or bar 30, said legs 31 will engage the floor when the hand truck is brought to the position shown in Fig. 1 of the drawing.

The operation of the device will now be readily understood.

Whenever, in the use of the hand truck, the operator is desirous of placing blocking, pallets, dollies, or the like, under the package being handled, the front end of the nose of the hand truck is pushed under the edge of the package in the usual manner, whereupon the operator, by depressing the handles 11 at the other ends of the side members 10, will cause the package to be raised to the position shown in Fig. 1 of the drawing. The operator may then push the rod or bar 30 forward to cause the legs 31 to be brought to the positions shown in full lines in Fig. 1 of the drawing, whereupon the package being handled will be maintained in the elevated or raised position without being held by the operator.

The operator will thus be freed to perform any action he may desire with respect to the package, such as placing of blocks or pallets thereunder to raise the package so that the same may be thereafter handled by means of a fork lift truck, or for the placing of a dolly thereunder without requiring the assistance of another operator for that purpose.

We claim:

1. In a hand truck of the type comprising a frame provided with wheels on each side near one end thereof, handles at the other end thereof, and a nose portion projecting outwardly from the frame at the wheel end thereof, means mounted on the under side of the frame for maintaining the truck with the nose portion thereof in an elevated position; said means comprising a longitudinally slidable member, leg members integral with and carried at the forward end of said slidable member, a handle portion at the rear end of said slidable member, and means for normally holding said slidable member and the legs carried thereby in the retracted position, the leg members being rigidly positioned beneath the nose portion of the truck when the slidable member is moved forward.

2. In a hand truck of the type comprising a frame provided with wheels on each side near one end thereof, handles at the other end thereof, and a nose portion projecting outwardly from the frame in the wheel end thereof, means mounted on the under side of the frame for maintaining the truck with the nose portion thereof in an elevated position, said means comprising a longitudinally slidable bar, leg members integral with and carried at the forward end of said bar, a handle portion at the rear end of said bar, bracket members in which said bar is slidably mounted, and means for normally holding said bar in the retracted position, the leg members being rigidly positioned beneath the nose portion of the truck when the slidable member is moved forward.

3. In a hand truck of the type comprising a frame provided with wheels on each side near one end thereof, handles at the other end thereof, and a nose portion projecting outwardly from the frame at the wheel end thereof, means mounted on the under side of the frame for maintaining the truck with the nose portion thereof in an elevated position, said means comprising a longitudinally slidable bar, leg members integral with and carried at the forward end of said bar, a handle portion at the rear end of said bar, and bracket members in which said bar is slidably mounted, the bar being notched to engage a portion of one of said brackets when said bar is in the retracted position, the leg members being rigidly positioned beneath the nose portion of the truck when the slidable member is moved forward.

ALBERT I. CODY.
WILLIAM E. BRANDLEY.

REFERENCES CITED

The following references are of record in the file of this patent:

UNITED STATES PATENTS

| Number | Name | Date |
|---|---|---|
| 1,137,993 | McCarthy | May 4, 1915 |
| 1,259,614 | Garver | Mar. 19, 1918 |
| 1,709,737 | Perry | Apr. 16, 1929 |

FOREIGN PATENTS

| Number | Country | Date |
|---|---|---|
| 3,039 | Australia | June 23, 1927 |